US010878590B2

(12) United States Patent
Sinha et al.

(10) Patent No.: US 10,878,590 B2
(45) Date of Patent: Dec. 29, 2020

(54) FUSING DISPARITY PROPOSALS IN STEREO MATCHING

(71) Applicant: Microsoft Technology Licensing, LLC, Redmond, WA (US)

(72) Inventors: Sudipta Narayan Sinha, Kirkland, WA (US); Marc André Léon Pollefeys, Seattle, WA (US); Johannes Lutz Schönberger, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 15/990,204

(22) Filed: May 25, 2018

(65) Prior Publication Data

US 2019/0362514 A1 Nov. 28, 2019

(51) Int. Cl.
*G06T 7/593* (2017.01)
*G06K 9/62* (2006.01)
*H04N 13/00* (2018.01)

(52) U.S. Cl.
CPC ............ *G06T 7/593* (2017.01); *G06K 9/6212* (2013.01); *G06T 2207/20228* (2013.01); *H04N 2013/0081* (2013.01)

(58) Field of Classification Search
CPC .................................. G06T 7/593; G06K 9/62
See application file for complete search history.

(56) References Cited

U.S. PATENT DOCUMENTS

| | | | | |
|---|---|---|---|---|
| 9,092,089 B2* | 7/2015 | Weishaupt | ............... | G06F 3/044 |
| 9,423,890 B2* | 8/2016 | Case | ................... | G06F 3/04883 |
| 9,916,524 B2* | 3/2018 | Fanello | .................. | G06K 9/627 |
| 9,916,667 B2* | 3/2018 | Choi | ....................... | G06T 7/593 |
| 10,097,805 B2* | 10/2018 | Bishop | ................. | H04N 13/257 |
| 10,334,158 B2* | 6/2019 | Gove | ............... | H04N 5/232411 |
| 10,366,472 B2* | 7/2019 | Lelescu | ................ | H04N 13/128 |
| 10,380,753 B1* | 8/2019 | Csordas | ................... | G06T 7/33 |
| 10,430,959 B2* | 10/2019 | Chang | ..................... | G06T 7/593 |
| 10,462,445 B2* | 10/2019 | Javidnia | ............... | G06K 9/6212 |
| 10,554,957 B2* | 2/2020 | Valentin | ............... | H04N 13/128 |
| 10,641,658 B1* | 5/2020 | Yu | ......................... | H04N 13/271 |
| 10,650,552 B2* | 5/2020 | Woods | ...................... | G06T 7/74 |
| 2009/0010495 A1* | 1/2009 | Schamp | ............. | B60R 21/0134 |
| | | | | 382/106 |
| 2010/0111444 A1* | 5/2010 | Coffman | ................. | G06T 7/593 |
| | | | | 382/285 |
| 2012/0257815 A1* | 10/2012 | Schlosser | ............... | H04N 13/15 |
| | | | | 382/154 |
| 2014/0035909 A1* | 2/2014 | Abramoff | .............. | G06T 7/593 |
| | | | | 345/419 |

(Continued)

OTHER PUBLICATIONS

Hirschmuller, Heiko, "Stereo Processing by Semiglobal Matching and Mutual Information", In Journal of IEEE Transactions on Pattern Analysis and Machine Intelligence, vol. 30, Issue 2, Feb. 2008, pp. 328-341.

*Primary Examiner* — Mia M Thomas
(74) *Attorney, Agent, or Firm* — Schwegman Lundberg & Woessner, P.A.

(57) ABSTRACT

Stereo image reconstruction can be achieved by fusing a plurality of proposal cost volumes computed from a pair of stereo images, using a predictive model operating on pixel-wise feature vectors that include disparity and cost values sparsely sampled form the proposal cost volumes to compute disparity estimates for the pixels within the image.

20 Claims, 6 Drawing Sheets

(56) References Cited

U.S. PATENT DOCUMENTS

| | | | | |
|---|---|---|---|---|
| 2014/0063188 A1* | 3/2014 | Smirnov | ............... | G06T 7/593 |
| | | | | 348/43 |
| 2014/0307047 A1* | 10/2014 | Kirk | ............... | H04N 13/25 |
| | | | | 348/42 |
| 2014/0313216 A1* | 10/2014 | Steingrimsson | ... | G06K 9/00402 |
| | | | | 345/589 |
| 2014/0363074 A1* | 12/2014 | Dolfing | ............... | G06K 9/6821 |
| | | | | 382/156 |
| 2016/0012315 A1* | 1/2016 | Perrin | ............... | G06K 9/2063 |
| | | | | 382/161 |
| 2016/0019437 A1* | 1/2016 | Choi | ............... | G06T 7/593 |
| | | | | 382/218 |
| 2017/0242234 A1* | 8/2017 | Ashcroft | ............ | G01N 15/1436 |
| 2018/0061068 A1* | 3/2018 | Jiao | ............ | G06T 5/005 |
| 2018/0139431 A1* | 5/2018 | Simek | ............ | H04N 13/232 |
| 2018/0211401 A1* | 7/2018 | Lee | ............ | G06T 7/593 |
| 2019/0080464 A1* | 3/2019 | Lee | ............ | H04N 13/271 |
| 2019/0156206 A1* | 5/2019 | Graham | ............ | G06N 3/0454 |
| 2020/0012850 A1* | 1/2020 | Kim | ............ | G06K 9/00402 |
| 2020/0160533 A1* | 5/2020 | Du | ............ | G06T 7/596 |
| 2020/0160537 A1* | 5/2020 | Urtasun | ............ | G06T 7/285 |
| 2020/0218908 A1* | 7/2020 | Lee | ............ | G06K 9/4661 |
| 2020/0273192 A1* | 8/2020 | Cheng | ............ | G06T 7/593 |

* cited by examiner

FUSING DISPARITY PROPOSALS IN STEREO MATCHING

TECHNICAL FIELD

The disclosed subject matter relates to computer vision and, specifically, stereo image reconstruction.

BACKGROUND

Stereo image reconstruction constitutes an important task in computer vision, and has wide-ranging applications, including, for example, three-dimensional (3D) mapping, robot and drone navigation, and computer-assisted driving. Stereo image reconstruction generally involves processing a pair of two-dimensional (2D) images taken from slightly different viewpoints to compute the scene depth, a third dimension, based on the difference in apparent location of an image feature between the two images. The key problem addressed by any stereo image reconstruction method is to match a pixel in one image (herein the "base" image) to a pixel showing the same object or feature in the other image (herein the "match" image). When the input image pair has been rectified using a stereo rectification process, based on the one-dimensional (1D) horizontal displacement between the two matching pixels in the rectified images, often called the "disparity," the depth of the object or feature can then be straightforwardly calculated.

Among many available stereo matching algorithms, semi-global matching (SGM) has become a popular technique due to its efficiency and parallelizability, which render it suitable for real-time stereo image reconstruction on field-programmable gate arrays (FPGAs) and graphic processing units (GPUs). In SGM (as in other stereo matching algorithms), each pixel in the base image is assigned a matching cost as a function of the disparity between that pixel of the base image relative to a pixel of the match image. For any given disparity value, the matching cost measures the degree of dissimilarity (e.g., in terms of intensity or color values) between the corresponding pair of pixels of the base and match images, or between respective image patches surrounding the two corresponding pixels. By jointly minimizing the cost function for all pixels in conjunction with an additional term that penalizes differences in disparity between adjacent or neighboring pixels in the image (to encourage smooth variations of the disparity across the image and thereby to reduce the effect of image noise), the true disparities for the pixels can be estimated. While "global stereo matching" techniques to solve this 2D optimization problem exist, they tend to be NP-complete and, thus, computationally expensive. SGM, therefore, approximates the 2D optimization by multiple independent 1D optimization problems corresponding to multiple canonical scanline directions in the image. The 1D optimization problems can be solved exactly in polynomial time, using dynamic programming, by aggregating matching costs along the various scanline directions. The resulting multiple aggregated costs for each pixel are then summed up over all scanline directions to compute a final aggregated pixelwise cost for each disparity, and a winner-take-all (WTA) strategy is used to select for each pixel the disparity value with the minimum aggregated cost. The disparities of the individual pixels can be assembled into a disparity map for the stereo image pair. The summation across scanline directions, which serves in part to reduce streaking artifacts in the disparity map, works well for some images, but is ineffective for images capturing weakly textured slanted surfaces, and inadequate when the individual scanline optimizations yield inconsistent results. Accordingly, an improved stereo matching algorithm is desirable.

SUMMARY

Described herein is an approach to stereo matching that utilizes a learned predictive model, trained based on stereo image pairs and associated ground-truth disparity maps, to fuse a plurality of proposal cost volumes each representing a pixelwise matching cost as a function of disparity. In various embodiments, at least some of the proposal cost volumes are generated by 1D scanline optimizations as known from SGM, but the ad-hoc steps of aggregating matching costs across scanline directions followed by WTA disparity selection are replaced by determining, for each pixel, the minimum-cost disparity values for all of the proposal cost volumes individually, and then selecting one among these minimum-cost disparity values (herein also "disparity proposals") for the respective pixel. The selection may be achieved by using the predictive model to compute pixelwise posterior probability distributions over the disparity proposals, and picking the disparity proposal with the highest posterior probability. Heuristically, this procedure selects the "best" among the various disparity proposals. In some embodiments, a refined disparity estimate for each pixel is obtained by averaging over a subset of the disparity proposals that are close in value to the selected "best" disparity, weighted by the respective posterior probabilities. The sum of these posterior probabilities may be assigned to the disparity estimate for the pixel as a confidence measure. A subsequent spatial filtering step may enhance the spatial smoothness of the disparity map and confidence map by computing the median of the disparity and confidence measure, respectively, over local neighborhoods of pixels with similar intensity or color value.

The predictive model generally operates on pixelwise feature vectors of disparity and cost values sampled from the proposal cost volumes. For the sake of computational tractability, the sampling may be sparse to yield "light-weight" feature vectors. For example, in some embodiments, each feature vector includes (merely) the minimum-cost disparity values of all proposal cost volumes and, for each of the minimum-cost disparity values, the respective matching cost values of all proposal cost volumes. Beneficially, such a feature representation is fixed-size regardless of the range of disparity values, rendering the model generalizable. The predictive model may be a classification or regression model. Random forest classifiers, for instance, have proven to provide a good trade-off between accuracy and efficiency. However, the model may also be, for example, a support vector machine, decision tree, neural network, etc.

BRIEF DESCRIPTION OF THE DRAWINGS

The foregoing will be more readily understood from the following detailed description of various embodiments, in particular, when taken in conjunction with the accompanying drawings.

DETAILED DESCRIPTION

Described herein are systems, methods, devices, and computer program products for computer vision and, more specifically, stereo image reconstruction.

Figure 1:
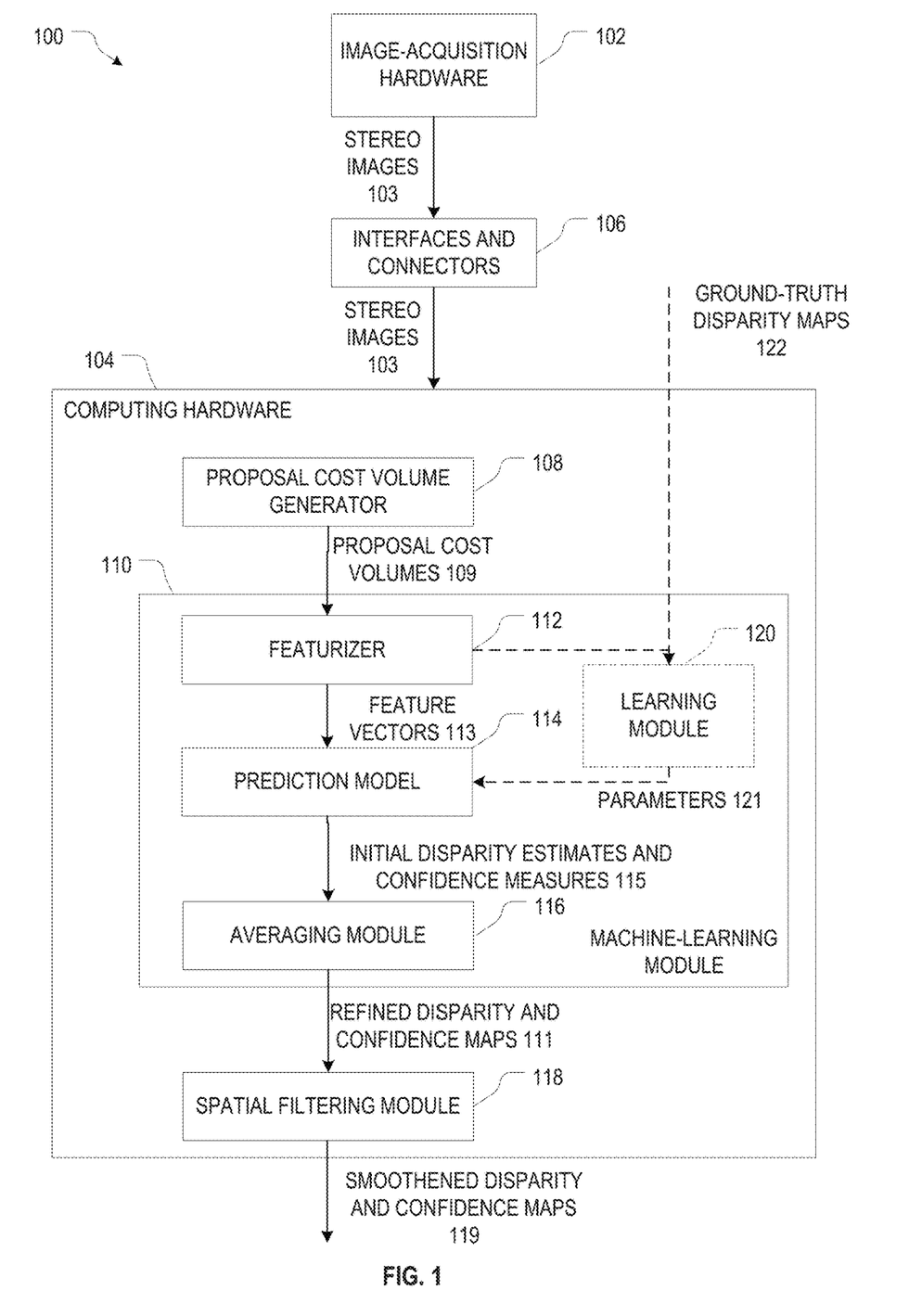
FIG. 1 is a block diagram of an example computer-vision system implementing stereo matching in accordance with various embodiments.

FIG. 1 illustrates, in block-diagram form, an example computer-vision system 100 in accordance with various embodiments. The system 100 includes image-acquisition hardware 102 for acquiring a pair of images 103 from slightly different viewpoints. In some embodiments, the image acquisition hardware 102 is a stereo camera device. The stereo camera device may include two cameras, each including a respective sensor (e.g., CCD) array and lens, placed at a known distance from each other, or, alternatively, a single camera that moves in a controlled manner between image acquisitions to capture a scene from different directions. As an alternative to a stereo camera device, a single camera that is manually moved by a known distance to, in effect, capture a stereo image pair may also serve as the image-acquisition hardware 102. The camera(s) may acquire still images or video, and may be analog or digital cameras (if the former, an analog-to-digital converter may be used to transform the analog camera output into a digital signal for subsequent processing).

The system 100 further includes computing hardware 104, including one or more general-purpose processors configured by suitable software and/or one or more special-purpose processors, to process the stereo images 103 in accordance with the methods described herein below. In some embodiments, the computing hardware 104 includes one or more general-purpose computers, with memory storing software programs for execution by one or more central processing units (CPUs) and/or GPUs. In other embodiments, the images are processed in whole or in part by an FPGA, application-specific integrated circuit (ASIC), digital signal processor (DSP), or other type of special-purpose processor, which, beneficially, can drastically reduce power requirements as compared with implementations using general-purpose hardware. The overall computational functionality may also be distributed between special-purpose and programmed general-purpose processors.

The computing hardware 104 receives the images 103 from the image-acquisition hardware 102 via one or more suitable interfaces and/or connectors 106, depending on the types of devices and the manner in which they are integrated. In some embodiments, the computing hardware 104 and image-acquisition hardware 102 may both be part of the same stand-alone device (that is, a self-contained device capable of operating without further hardware). For example, an FPGA or other processor may be integrated as an embedded device into a virtual-reality headset or robot equipped with a stereo camera. Similarly, a laptop, tablet, smart phone, or other personal computing device may have an embedded camera. In these embodiments, an internal device bus may transport the camera output signals from the camera(s) to the processor(s) of the stand-alone device. Alternatively, the computing hardware 104 may be provided as one or more devices separate from the image-acquisition hardware 102, and the image data may be transmitted via a wired or wireless communication link. For instance, a stereo camera device may send its camera output signals via a cable (e.g., a USB cable, a Gigabit ethernet cable, a ribbon cable, etc.) or via Bluetooth to a nearby (e.g., desktop, laptop, or tablet) computer. As another example, stereo image pairs may be uploaded from the image-acquisition hardware 102 to the internet, from which the computing hardware 104 may download them via a wired or wireless network connection. Other configurations of the image-acquisition and computation hardware 102, 104 may occur to those of ordinary skill in the art, the above non-limiting examples being intended merely to provide a flavor of various application contexts.

As shown in FIG. 1, the overall image-processing functionality provided by computing hardware 104 may be organized in multiple functional blocks, components, or modules. In an FPGA or ASIC embodiment, these functional blocks may correspond to various separate physical digital logic blocks (or groups thereof). In software implementations, the functional blocks may correspond to blocks of program code (or, put differently, groups of processor-executable instructions). Although a particular organization into functional blocks is depicted, it will be appreciated that other ways of grouping functions within the overall computational process are also possible.

As depicted, the functional blocks may include a proposal cost volume generator 108 that processes the stereo images 103 to create multiple proposal cost volumes 109 for each image pair 103, and a machine-learning module 110 that fuses the proposal cost volumes 109 to generate a single disparity map and associated confidence map 111 for each image pair. The proposal cost volume generator 108 may, for instance, be or include a conventional SGM scanline optimizer that generates a proposal cost volume for each of multiple canonical scanline directions in a manner briefly explained below. The machine-learning module 110 may include a featurizer 112 that samples the proposal cost volumes 109 to generate a feature vector 113 for each image pixel, a prediction model 114 that generates initial estimates of the disparity and associated confidence measure for each pixel, and, optionally, an averaging module 116 that averages over disparity proposals in the vicinity of the initial disparity estimate to obtain refined disparity estimates. A spatial-filtering module 118 may perform post-processing to smoothen the disparity map and associated confidence map. The smoothened maps 119 may be provided as output, e.g., to a downstream processing module or a display device (not shown).

The machine-learning module 110 may also include a learning module 120 that implements a machine-learning algorithm to train the prediction model 114 (i.e., determine the values of adjustable model parameters 121) in a supervised manner based on training data including, in addition to the stereo image pairs 103, associated ground-truth disparity maps 122 (e.g., as obtained with another, highly accurate but possibly computationally expensive stereo image reconstruction algorithm, or by other means, such as time-of-flight or other direct depth measurements). Note, however, that once training of the prediction model 114 has been completed (i.e., all adjustable parameters of the model have been set), the learning module 120 is no longer needed. Accordingly, a computer-vision system 100 intended for use solely during the inference phase may be preloaded with a trained prediction model 114 and omit the learning algorithm 120.

Figure 2A:
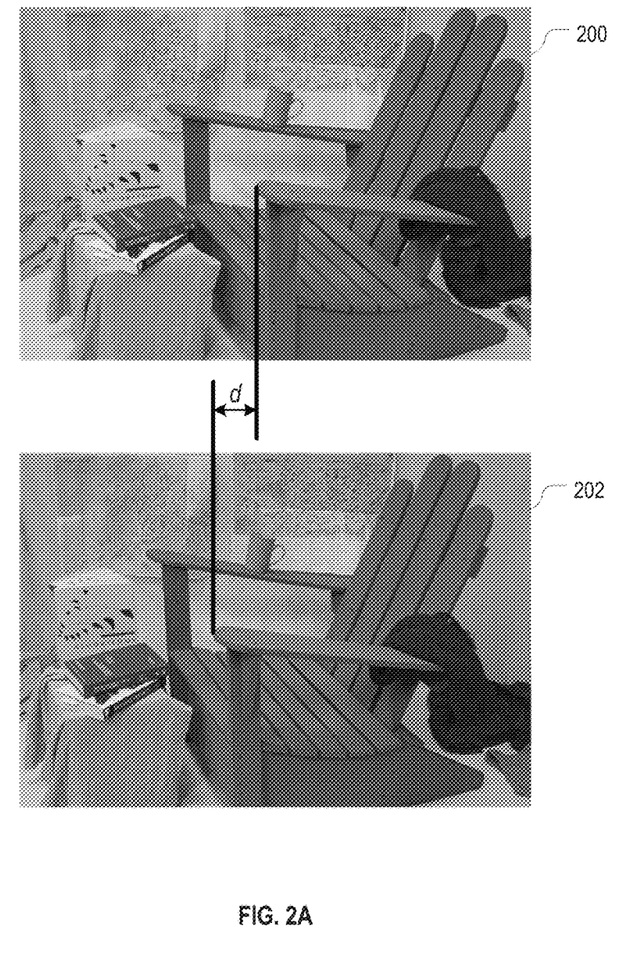
FIG. 2A is an example stereo image pair.
Figure 2B:
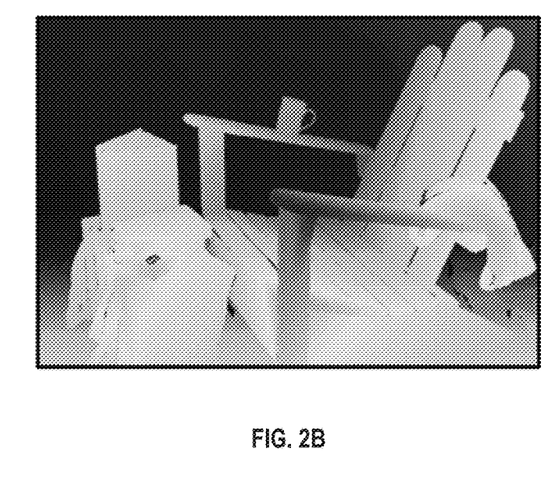
FIG. 2B is a ground-truth disparity map associated with the stereo image pair of FIG. 2A.

Turning now to FIGS. 2A-2J, various disparity maps for an example stereo image pair are illustrated. FIG. 2A shows, in grayscale corresponding to image intensity, two images 200, 202 (herein the base and match images) of a chair, taken from slightly different directions with cameras that are horizontally displaced relative to each other. A given feature in the base image 200 will generally occur at a slightly different position in the match image 202 (unless occluded in the latter). This is illustrated in FIG. 2A with the example of the front corner of the left arm rest of the chair, which, in the base image 200 (which corresponds to the left of the two images), is shifted to the right by a pixel distance d relative to its location in the match image 202 (which corresponds to the right of the two images). This pixel distance between corresponding features in the two images is the disparity. FIG. 2B shows a disparity map for the entire image that is used as the ground-truth, i.e., deemed to reflect the "true" disparity between the base and match images. The grayscale values of the disparity map encode the disparity, white corresponding to zero disparity.

Figure 2C:
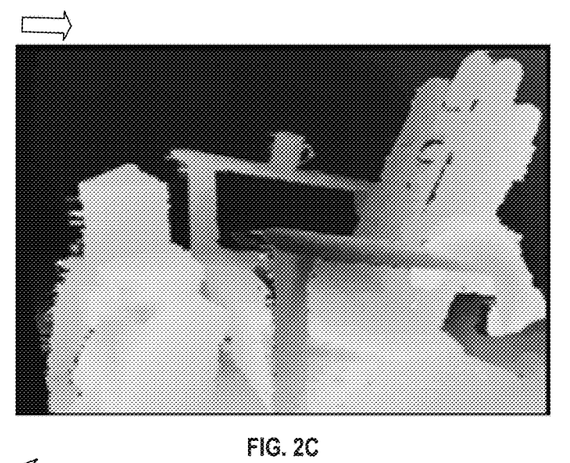
FIG. 2C is a disparity map computed from the stereo image pair of FIG. 2A by 1D scanline optimization in a horizontal direction.
Figure 2D:
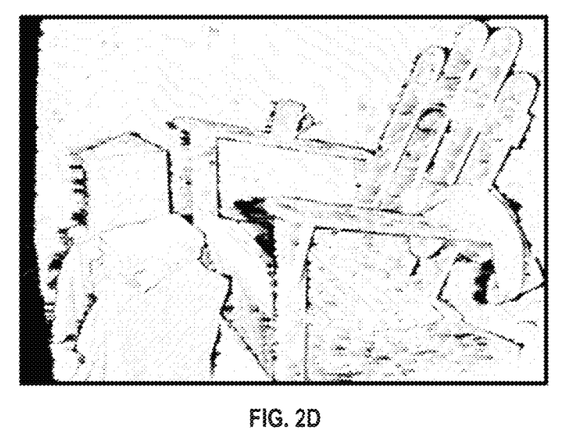
FIG. 2D is an error map measuring the difference between the disparity map of FIG. 2C and the ground-truth disparity map of FIG. 2B.
Figure 2E:
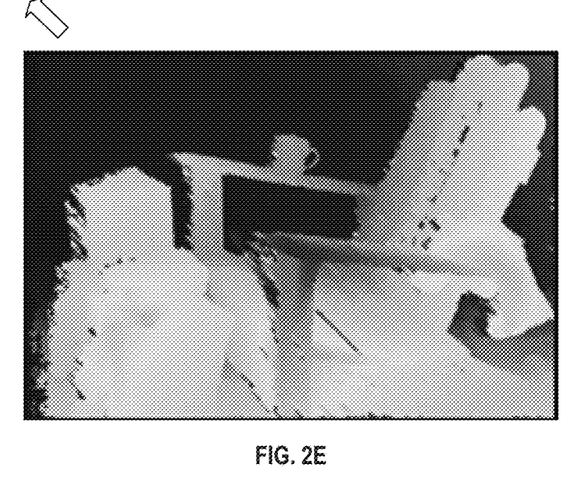
FIG. 2E is a disparity map computed from the stereo image pair of FIG. 2A by 1D scanline optimization in a diagonal direction.
Figure 2F:
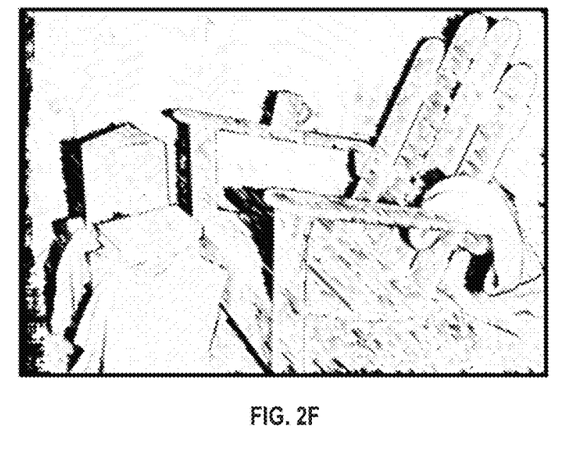
FIG. 2F is an error map measuring the difference between the disparity map of FIG. 2E and the ground-truth disparity map of FIG. 2B.

FIGS. 2C and 2E are disparity maps computed from the stereo image pair of FIG. 2A by 1D scanline optimizations in a horizontal direction from left to right and a diagonal direction from bottom right to top left, respectively (as indicated by the arrows above the images). FIGS. 2D and 2F are corresponding error maps that measure the difference between the disparity map of FIG. 2C or 2E, respectively, and the ground-truth disparity map of FIG. 2B. As can be seen, both scanline optimizations suffer from directional bias due to their respective propagation directions, but each solution is accurate in certain image regions where the other one is inaccurate. For example, the horizontal pass produces accurate disparities near the left occlusion boundaries of the chair, whereas the diagonal pass performs better on the right occlusion edges.

Figure 2G:
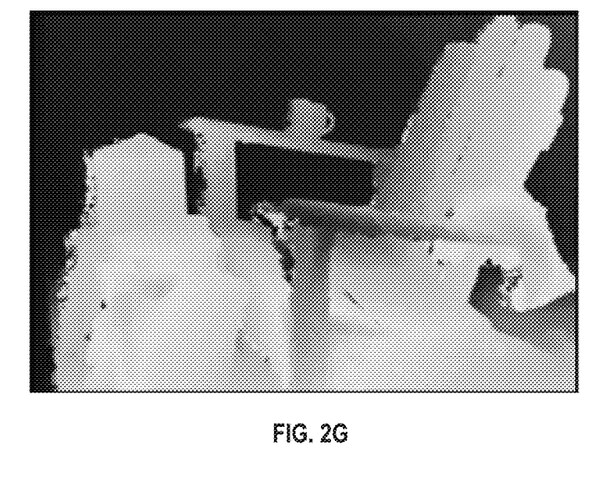
FIG. 2G is a disparity map computed from the stereo image pair of FIG. 2A by SGM.
Figure 2H:
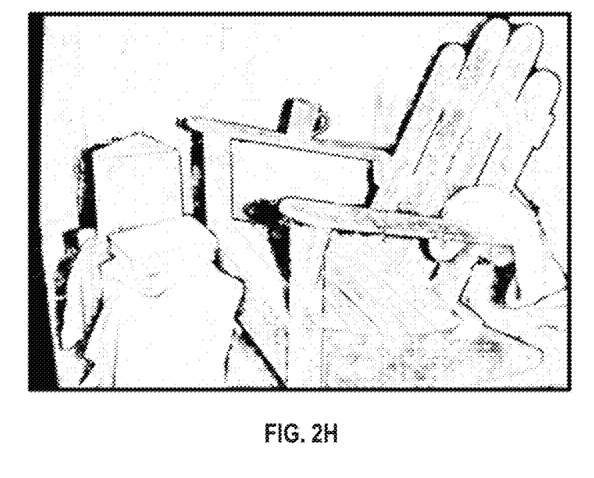
FIG. 2H is an error map measuring the difference between the disparity map of FIG. 2G and the ground-truth disparity map of FIG. 2B.

FIG. 2G is a disparity map computed from the stereo image pair of FIG. 2A by SGM with eight canonical 1D scanline optimizations, including those shown in FIGS. 2C and 2E. FIG. 2H is an error map measuring the difference between the SGM disparity map of FIG. 2G and the ground-truth disparity map of FIG. 2B. Whereas SGM is, overall, more accurate than each scanline optimization individually, it is worse than the horizontal pass at the left occlusion boundaries of the chair and worse than the diagonal pass at the right occlusion boundaries of the chair. Accordingly, the joint accuracy of all scanlines—understood as a theoretical upper bound of the achievable accuracy of an oracle that has access to ground truth and selects the best out of all the scanline solution proposals—is much higher than that of SGM. This observation is exploited, in accordance with various embodiments, by selecting the best out of, rather than aggregating over, multiple 1D scanline proposals for each pixel.

Figure 2I:
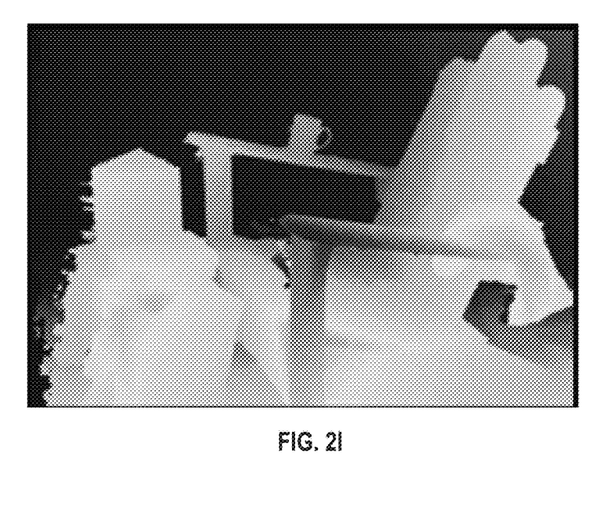
FIG. 2I is an example disparity map computed from the stereo image pair of FIG. 2A by fusing multiple disparity proposals in accordance with various embodiments.
Figure 2J:
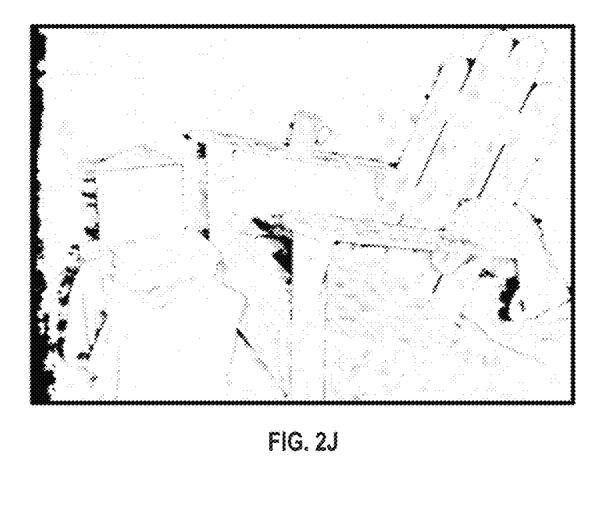
FIG. 2J is an error map measuring the difference between the disparity map of FIG. 2I and the ground-truth disparity map of FIG. 2B.

FIG. 2I is an example disparity map computed from the stereo image pair of FIG. 2A by fusing multiple 1D scanline disparity proposals using a per-pixel random-forest classifier trained on a low-dimensional input feature that encodes a sparse set of aggregated cost samples, in accordance with one embodiments. As can be seen from the error map of FIG. 2J, which shows the difference between the disparity map of FIG. 2I and the ground-truth disparity map of FIG. 2B, this approach significantly outperforms SGM as well as the individual 1D scanline optimizations.

Figure 3:
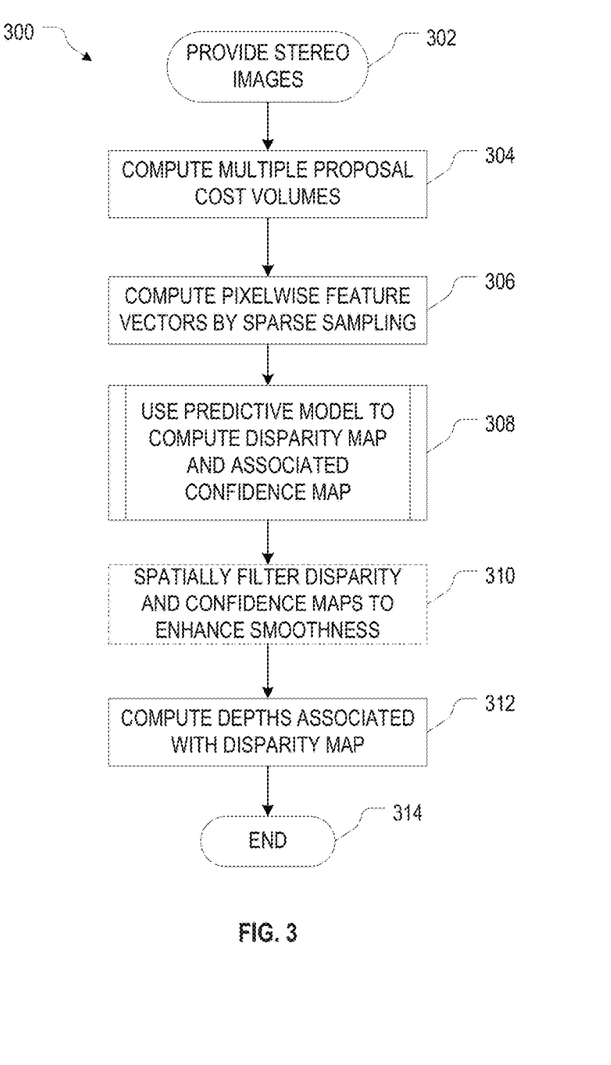
FIG. 3 is a flow chart of a stereo image reconstruction method in accordance with various embodiments.
Figure 4:
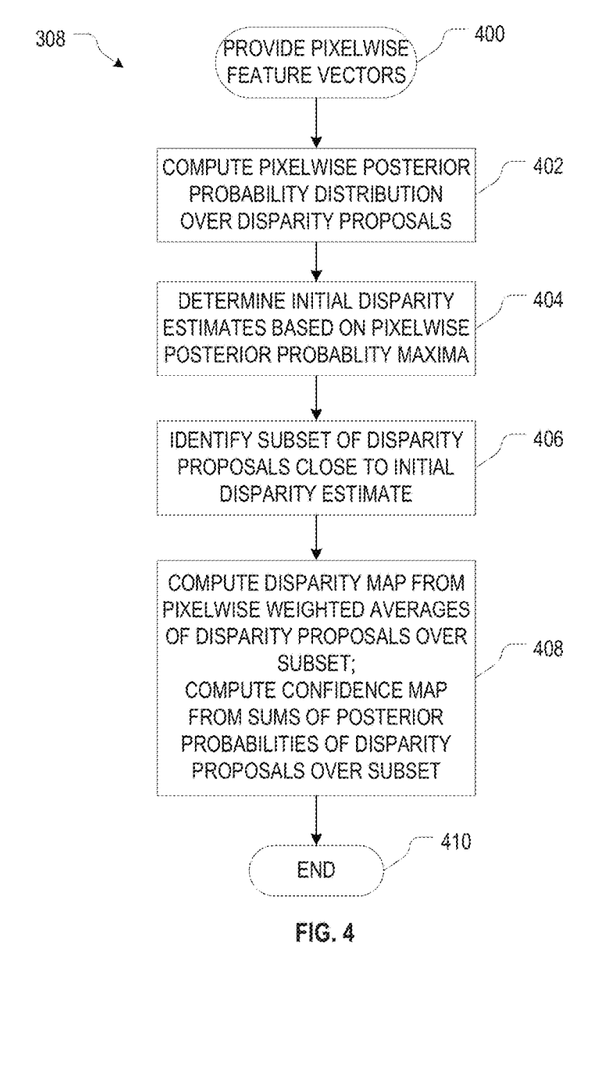
FIG. 4 is a flow chart of a method of computing, as part of the image reconstruction method of FIG. 3, a disparity map from feature vectors sampled from a plurality of proposal cost volumes, using a learned predictive model, in accordance with various embodiments.

Turning to FIGS. 3 and 4, a stereo image reconstruction method 300 in accordance with various embodiments will now be described. Starting point of the method 300 is a pair of stereo images 302 (i.e., a base image and corresponding match image), as may be acquired, e.g., by a stereo camera or other image-acquisition hardware 102. From this pair of images, multiple proposal cost volumes are computed in operation 304. Each proposal cost volume represents a matching cost $K_n(\vec{p}, d)$ (where n is an index enumerating the proposal cost volumes) as a function of the pixel vector $\vec{p} \in \mathbb{R}^2$ (a two-dimensional vector corresponding to the location of the pixel in the base image, e.g., in terms of column and row numbers) and the disparity $d \in \mathcal{D} = \{d_{min}, \ldots, d_{max}\}$ between base and match images.

In various embodiments, one or more of the proposal cost volumes $K_n(\vec{p}, d)$ are obtained by 1D scanline optimization along scanline directions $\vec{r}$, such as, e.g., any or all of the eight canonical directions, which include, in (x, y)-coordinate notation, horizontal directions (1,0) and (−1,0), vertical directions (0,1) and (0, −1), and diagonal directions (1,1), (1, −1), (−1,1), and (−1, −1). The proposal cost volume $L_{\vec{r}}(\vec{p}, d)$ for any given scanline direction $\vec{r}$ is computed recursively by aggregating pixelwise matching costs along the scanline (usually starting with a pixel on the image border), e.g., in accordance with:

$$L_{\vec{r}}(\vec{p}, d) = C_{\vec{p}}(d) + \min_{d' \in \mathcal{D}} (L_{\vec{r}}(\vec{p} - \vec{r}, d) + V(d, d')).$$

Herein, $C_{\vec{p}}(d)$ is a unary data term that encodes the cost, or penalty, of assigning pixel $\vec{p}$ to disparity d, and V(d,d') is a pairwise smoothness term that penalizes disparity differences between neighboring pixels $\vec{p}$ and $\vec{p} - \vec{r}$ in the scanline. The unary term $C\vec{p}(d)$ may be computed from the pixel intensities within a fixed-size image region $\mathcal{N}_{\vec{p}}$ (or "patch") centered at $\vec{p}$ in the base image and a corresponding patch centered at pixel $\vec{p} - \vec{d}$ (where $\vec{d}$ indicates the magnitude d as well as the direction of the disparity) in the match image.

The unary term may, for example, take the form of the sum, over the image region $\mathcal{N}_{\vec{p}}$, of the absolute intensity differences between a pixel $\vec{q}$ in the base image and a corresponding pixel $\vec{q}-\vec{d}$ in the match image:

$$C_{\vec{p}}(d) = \Sigma_{\vec{q} \in N_{\vec{p}}} |I^{base}(\vec{q}) - I^{match}(\vec{q}-\vec{d})|.$$

Other suitable forms of the unary term $C_{\vec{p}}(d)$ include, for example, a normalized cross-correlation (NCC) of the pixel intensities of the corresponding image patches, and the output of a matching-cost convolutional neural network (MC-CNN), specifically, either the fast or the accurate variant (MC-CNN-fast, MC-CNN-acrt); these and other cost terms are well-known in the art. The smoothness term V(d,d') is chosen, in some embodiments, to have the following specific form:

$$V(d, d') = \begin{cases} 0 & \text{if } d = d' \\ P_1 & \text{if } |d - d'| = 1 \\ P_2 & \text{if } |d - d'| \geq 2 \end{cases},$$

which favors first-order smoothness, that is, has a preference for fronto-parallel surfaces. However, other forms of V(d,d') may also be used.

In some embodiments, proposal cost volumes are computed for fewer than all eight canonical 1D scanline directions. For instance, to facilitate further processing of computed portions of the proposal cost volumes (e.g., computation of pixelwise feature vectors) before the computation of the proposal cost volumes in their entirety is completed, a subset of five scanline directions that all fall within a semicircle of directions (e.g., the two horizontal directions (1,0) and (−1,0), the vertical top-to-bottom direction (0,−1), and the two diagonal top-to-bottom directions (1,−1) and (−1,−1)) may be selected.

Conversely, the proposal cost volumes $K_n(\vec{p},d)$ used in method 300 are not necessarily limited to the 1D-scanline proposal cost volumes $L_{\vec{r}}(\vec{p},d)$ in one or more of the eight canonical directions. In some embodiments, an SGM cost volume generated by aggregating over the individual scanline directions, $S(\vec{p},d) = \Sigma_{\vec{r}} L_{\vec{r}}(\vec{p},d)$, serves itself as one of multiple proposal cost volumes. Further, in addition to proposal cost volumes computed by 1D scanline optimization for the base image, the set of proposal cost volumes also includes, in some embodiments, one or more proposal cost volumes obtained by 1D scanline optimizations performed for the match image (in other words, computed with reversed roles of the two images as base and match images). (Scanline optimizations computed, for the same scanline direction, for the base image versus the match image differ, for example, in the pixels at the image margin that constitute the start and end points of a scanline. Further differences can result from pixels in the base image being occluded in the match image or vice versa.) The set of proposal cost volumes may be further extended by repeating the computations for different image resolutions (e.g., full resolution, half resolution, and quarter resolution for three proposal cost volumes for each scanline direction and/or other type of proposal).

Each proposal cost volume $K_n(\vec{p},d)$ inherently provides an associated disparity proposal for each pixel, corresponding to the disparity value with minimum cost:

$$d_{\vec{p}}^*(n) = \underset{d}{\operatorname{argmin}} K_n(\vec{p}, d).$$

The different disparity proposals, such as the disparities of different 1D scanline solutions (e.g., as reflected in the disparity maps of FIGS. 2C and 2D), are often inconsistent, especially in areas of weak data cost (e.g., texture-less areas), where matching cost alone may not allow distinguishing between a true correspondence between pixels and a false (apparent) correspondence. Yet, in many cases, at least one of the disparity proposals is correct or at least very close to the correct (ground-truth) disparity. In accordance with various embodiments, therefore, the fusion of proposal cost volumes is cast as a pixelwise classification problem that chooses the optimal disparity estimate from the given set of disparity proposals. The patterns at which, for instance, specific 1D scanline optimizations perform well tend to be consistent and repeatable, and, thus, lend themselves to encoding into rules that can identify the correct solution from a given set of disparity proposal. While such rules could, in principle, be hand-crafted, various embodiments take the more feasible and less error-prone approach of automatically learning these rules from training data in a supervised fashion. To facilitate the learning of the rules, the proposal cost volumes are featurized, in accordance herewith, to provide discriminative signals to a predictive model for a robust and efficient disparity prediction.

Accordingly, with renewed reference to FIG. 3, once the proposal cost volumes $K_n(\vec{p},d)$ (or at least corresponding portions thereof) have been computed, pixelwise feature vectors $\vec{f}_{\vec{p}}$ are computed, in operation 306, by sparse sampling from the disparity values and associated matching costs of all proposal cost volumes $K_n(\vec{p},d)$. These feature vectors $\vec{f}_{\vec{p}}$ are then fed into a learned model F that predicts, in operation 308, a disparity estimate $\hat{d}_{\vec{p}}$ along with an associated posterior probability $\hat{p}_{\vec{p}}$ for each pixel:

$$(\hat{d}_{\vec{p}}, \hat{q}_{\vec{p}}) = F(\vec{f}_{\vec{p}}) \text{ with } \hat{d}_{\vec{p}} \in \mathbb{R}_0^+, \hat{q}_{\vec{p}} \in [0,1]$$

In some embodiments, the feature vector $\vec{f}_{\vec{p}}$ is a concatenation of the locations of the pixelwise WTA solutions (i.e., the minimum-cost disparities)

$$d_{\vec{p}}^*(n) = \underset{d}{\operatorname{argmin}} K_n(\vec{p}, d)$$

of all proposal cost volumes and the corresponding matching costs $K_m(\vec{p}, d_{\vec{p}}^*(n))$ in all proposal cost volumes, where both n and m run over the number N of proposal cost volumes. The feature vectors are, in these embodiments, composed of N disparity proposals and $N^2$ sparsely sampled costs, such that $\vec{f}_{\vec{p}} \in \mathbb{R}^{N+N^2}$. For each disparity proposal, its relative significance with respect to the other proposals is thereby encoded in a compact representation. This representation captures the intuition that, when multiple proposals agree, their minima $d_{\vec{p}}^*(n)$ are close and their respective costs $$K_m(\vec{p}, d_{\vec{p}}^*(n)) \text{ are low.}$$

Other combinations of disparities and matching costs sparsely sampled from the proposal cost volumes may be used for the feature vectors. In general, sparse sampling—as distinguished from a naïve concatenation of the matching costs for all disparities across all proposal cost volumes—is beneficial for two reasons. First, it provides a light-weight feature representation and corresponding predictive model that entail small runtime overhead and, thus, largely retain the computational efficiency that renders SGM attractive. For example, with eight 1D-scanline proposal cost volumes and $|\mathcal{D}|=256$ possible disparity values, the above-defined feature vector has only $8+8^2=72$ dimensions, whereas the naïve feature representation would have $8 \cdot 256=2048$ dimensions. Second, using a fixed-size feature representation, that is, a feature representation that is independent of the size of the disparity range $\mathcal{D}$, renders the model generalizable to scenes with varying disparity range $\mathcal{D}$, allowing the range $\mathcal{D}$ to differ, e.g., between the training and inference phases.

Given a training set of stereo image pairs and associated ground-truth disparity maps, the predictive model F can be learned in a supervised manner in multiple ways, depending on the type of model. Classifier models have been shown to provide good results, but regression models may, in principle, also be used. Further, among various types of classifiers well-known in the art, such as support vector machines, decision trees, random forests, neural networks, k-nearest-neighbor (k-NN) algorithms, etc., random forests have been found to provide a good trade-off between accuracy and efficiency. In brief, a random-forest classifier includes an ensemble of decision trees whose leaf nodes each correspond to one of the possible classifications, in the instant case, one of the proposals 1 . . . N. Each decision tree bifurcates at each node into two branches that partitions the input, as represented by points in a suitable feature space (e.g., corresponding to the $(N+N^2)$-dimensional feature vectors $\vec{f}_{\vec{p}}$), into two groups using a suitable split function. The parameters of the split functions are adjusted during training, based on training data with known classifications, to select splits that are discriminative with respect to the classifications. The proper classification of a feature vector $\vec{f}_{\vec{p}}$ derived from a set of proposal cost volumes can be straightforwardly determined from the ground-truth disparity by identifying the proposal cost volume whose minimum-cost proposal comes closest. The model can be trained using any of various well-known algorithms for training random forests, for instance, a greedy algorithm.

FIG. 4 illustrates a method 308 of computing, as part of the image reconstruction method 300 of FIG. 3, a disparity map and associated confidence map using a learned predictive model (random forest or other), in accordance with various embodiments. Starting point 400 of the method 308 are pixelwise feature vectors provided as input to the model. The model processes the feature vectors to compute, in operation 402, a pixelwise posterior probability distribution over the disparity proposals, that is, a posterior probability $\rho_{\vec{p}}(n)$ for each proposal n with corresponding disparity $d^*_{\vec{p}}(n)$. The proposal with the maximum posterior probability, $$d^*_{\vec{p}}(n^*) \text{ with } n^*_{\vec{p}} = \operatorname*{argmax}_n \rho_{\vec{p}}(n),$$

is then selected, in operation 404, as the initial disparity estimate for pixel $\vec{p}$. To refine this initial estimate, in step 406, a subset of disparity proposals close to the initial estimate and their corresponding posterior probabilities is determined:

$$\mathcal{D}^*_{\vec{p}} = \{(d^*_{\vec{p}}(k), \rho_{\vec{p}}(k)) | k=1 \ldots N \wedge |d^*_{\vec{p}}(k) - d^*_{\vec{p}}(n^*)| < \in_d\}$$

When multiple proposal cost volumes agree on a solution for a pixel, the subset $\mathcal{D}^*_{\vec{p}}$ contains multiple elements, even for small thresholds $\in_d$ of the permissible disparity difference. The refined (and in some embodiments final) pixelwise disparity estimates $\hat{d}_{\vec{p}}$ are computed, in operation 408, by averaging over the disparity proposals $d^*_{\vec{p}}(k)$ within the subset $\mathcal{D}^*_{\vec{p}}$, weighted by the respective posterior probabilities $\rho_{\vec{p}}(k)$:

$$\hat{d}_{\vec{p}} = \frac{\sum_k \rho_{\vec{p}}(k) \cdot d^*_{\vec{p}}(k)}{\sum_k \rho_{\vec{p}}(k)}.$$

Further, the associated confidence measures $\hat{\varrho}_{\vec{p}}$ are determined by summing over the posterior probabilities within the subset:

$$\hat{\varrho}_{\vec{p}} = \Sigma_k \rho_{\vec{p}}(k).$$

Note that the refined disparity estimates have sub-pixel precision, that is, $\hat{d}_{\vec{p}}$ can assume real, non-integer values. Moreover, all operations of method 308 are fully parallelizable at the pixel level, which renders them suitable for FPGA implementations.

With disparity and confidence maps computed based on the pixelwise feature vectors, the method 308 is complete at 410. The disparity map and/or confidence map may be output (e.g., on screen), immediately provided as input to downstream computations (e.g., depth computations for depth sensing or 3D image-reconstruction), or stored in a computer-readable medium for later use.

Referring again to FIG. 3, in some embodiments, the stereo image reconstruction method 300 includes an optional spatial filtering operation 310 to enhance the spatial smoothness of the disparity and confidence maps computed in operation 308. For this purpose, an adaptive local neighborhood $$\mathcal{N}_{\vec{p}} = \{\vec{q} \, | \, \|\vec{q} - \vec{p}\| < \in_{\vec{p}} \wedge \hat{\rho}_{\vec{q}} > \in_\varrho \wedge |I(\vec{p}) - I(\vec{q})| < \in_I\},$$

is defined for each pixel. The local neighborhood $\mathcal{N}_{\vec{p}}$ is centered around the pixel $\vec{p}$ (with distances between pixels $\vec{p}$ and $\vec{q}$ being smaller than a specified distance threshold $\in_{\vec{p}}$) and includes pixels $\vec{q}$ having similar image intensity (with an absolute intensity difference between the pixels $\vec{p}$ and $\vec{q}$ being smaller than a specified intensity-difference threshold $\in_I$) and having associated confidence measures $\hat{\rho}_{\vec{q}}$ above a specified confidence threshold $\in_\varrho$. The spatially filtered disparity and confidence estimates are given by the medians:

$$\bar{d}_{\vec{p}} = \operatorname{median} \hat{d}_{\vec{q}} \text{ and } \bar{\varrho}_{\vec{p}} = \operatorname{median} \hat{\varrho}_{\vec{q}} \text{ with}$$

$$\vec{q} \in \mathcal{N}_{\vec{p}}.$$

In some embodiments, following computation of the disparity map (with or without spatial filtering, as the case may be) or portions thereof, depths associated with the estimated disparities are computed in operation 312. For a disparity d computed from a pair of stereo images taken with two cameras with focal length f spaced a distance B apart (or a single camera moved by a distance B between acquisition of the two images), the depth z can be computed according to:

$$z = \frac{f \cdot B}{d}.$$

The depth computation, which completes the method 300 at 314, may flow into downstream methods, where it can be used in various ways and producing various outputs, depending on the particular application. For example, in some applications, a three-dimensional image or model of the imaged scene is reconstructed based on the two-dimensional stereo image(s) and the associated depths; for this purpose, data may be assembled across a set of more than two images that collectively cover the scene from a larger range of angles than a mere two images can afford (possibly from all angles). Such three-dimensional images or models can be used, for instance, in virtual-reality or augmented-reality applications (e.g., to provide, as visual output in an on-screen display, a virtual tour through a building or other space previously captured in images, or in gaming to place virtual objects properly within a scene filmed by a user-worn camera), in security applications where depth information may, for instance, improve facial recognition, or in engineering or similar applications that may use a three-dimensional model of an object as input. Depth sensing based on stereo reconstruction can also be used in various automation and navigation tasks. For example, robots and self-driving vehicles may use the determined depth of objects to avoid collisions, grab objects, etc. Yet another task employing depth sensing is motion tracking, e.g., as used in security applications to detect intruders or in human-machine interaction contexts to facilitate gesture-based control of a machine. As will be appreciate by those of ordinary skill in the art, disparities and depths need not necessarily be computed across the entire original image range in all applications. Rather, in some contexts, it may suffice to compute a disparity map and determine depth for an image region corresponding to a certain object of interest, e.g., as determined from the 2D images by edge detection and other means (and possibly confirmed by depth determinations around a margin of the detected edge).

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 5:
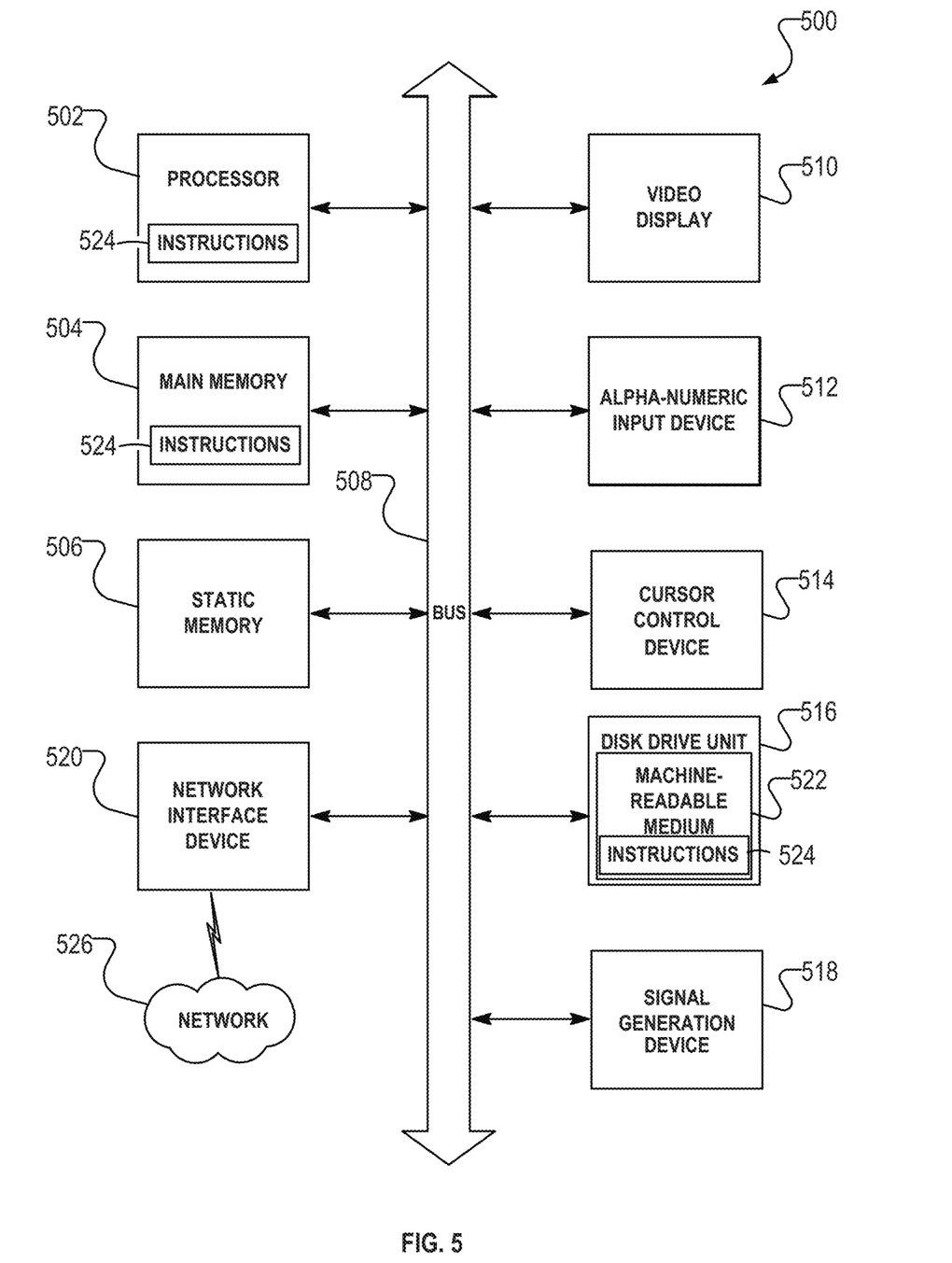
FIG. 5 is a block diagram of an example computing system as may be used to implement the methods of FIGS. 3 and 4, in accordance with various embodiments.

FIG. 5 is a block diagram of a machine in the example form of a computer system 500 within which instructions 524 may be executed to cause the machine to perform any one or more of the methodologies discussed herein. In alternative embodiments, the machine operates as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 can further include a video display 510 (e.g., a liquid crystal display (LCD) or a cathode ray tube (CRT)). The computer system 500 also includes an alpha-numeric input device 512 (e.g., a keyboard or a touch-sensitive display screen), a user interface (UI) navigation (or cursor control) device 514 (e.g., a mouse), a disk drive unit 516, a signal generation device 518 (e.g., a speaker), and a network interface device 520.

The disk drive unit 516 includes a machine-readable medium 522 on which are stored one or more sets of data structures and instructions 524 (e.g., software) embodying or utilized by any one or more of the methodologies or functions described herein. The instructions 524 can also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" can include a single medium or multiple media (e.g., a centralized or distributed database, and/or associated caches and servers) that store the one or more instructions 524 or data structures. The term "machine-readable medium" shall also be taken to include any tangible medium that is capable of storing, encoding, or carrying instructions 524 for execution by the machine and that cause the machine to perform any one or more of the methodologies of the present disclosure, or that is capable of storing, encoding, or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 524 can be transmitted or received over a communication network 526 using a transmission medium. The instructions 524 can be transmitted using the network interface device 520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 524 for execution by the machine, and includes digital or analog communications signals or other intangible media to facilitate communication of such software.

The following numbered examples are provided as illustrative embodiments.

Example 1

A stereo-matching method comprising: computing, with one or more hardware processors, from a pair of two-dimensional digital stereo images, a plurality of proposal cost volumes each representing a pixelwise cost as a function of disparity; computing, with the one or more hardware processors, pixelwise feature vectors comprising disparity and cost values sparsely sampled from the proposal cost volumes; and using a predictive model to compute, with the one or more hardware processors, from the pixelwise feature vectors, disparity estimates for pixels within a base image of the pair of stereo images.

Example 2

The method of example 1, wherein computing the pixelwise feature vectors comprises, for each of the feature vectors, selecting, from each of the plurality of proposal cost volumes, a respective minimum-cost disparity value.

Example 3

The method of example 2, wherein computing the pixelwise feature vectors further comprises, for each of the feature vectors, sampling the cost values of all of the proposal cost volumes at each of the minimum-cost disparity values.

Example 4

The method of example 2 or example 3, wherein computing the disparity estimates comprises: selecting, for each of the pixels, one of the minimum-cost disparity values from the plurality of proposal cost volumes based on posterior probabilities associated, for that pixel, with the plurality of proposal cost volumes.

Example 5

The method of example 4, wherein, for each of the pixels, the selected one of the minimum-cost disparity values constitutes an initial disparity estimate, and wherein computing the disparity estimates further comprising: computing, for each of the pixels, a refined disparity estimate as a weighted average of minimum-cost disparity values in a vicinity of the initial disparity estimate, weights in the weighted average being posterior probabilities associated with the proposal cost volumes corresponding to the minimum-cost disparity values.

Example 6

The method of any one of examples 1-5, further comprising: computing, using the predictive model, confidence measures associated with the disparity estimates for the pixels.

Example 7

The method of example 6, further comprising: computing, for each of the pixels, a spatially filtered disparity estimate as a median of disparity estimates of pixels within a local neighborhood comprising pixels with similar image intensity and with associated confidence measures above a specified threshold.

Example 8

The method of any one of examples 1-7, wherein the predictive model is a classifier model.

Example 9

The method of example 8, wherein the classifier model is a random-forest model.

Example 10

The method of any one of examples 1-9, wherein the proposal cost volumes comprise proposal cost volumes obtained by one-dimensional scanline optimizations for a plurality of scanline directions.

Example 11

The method of any one of examples 1-10, wherein all of the scanline direction associated with the one-dimensional scanline optimizations fall within a single semicircle of directions.

Example 12

The method of any one of examples 1-11, further comprising computing depths associated with the disparity estimates.

Example 13

A computer-vision system comprising: at least one hardware processor configured to perform operations comprising: computing, from a pair of two-dimensional digital stereo images comprising a base image and a match image, a plurality of proposal cost volumes each representing a pixelwise cost as a function of disparity; computing pixelwise feature vectors comprising disparity and cost values sparsely sampled from the proposal cost volumes; and using a predictive model to compute, from the pixelwise feature vectors, disparity estimates for pixels within a base image of the pair of stereo images.

Example 14

The system of example 13, wherein the at least one hardware processor comprises at least one of a field-programmable gate array or an application-specific integrated circuit.

Example 15

The system of example 14, wherein all of the scanline direction associated with the one-dimensional scanline optimizations fall within a single semicircle of directions.

Example 16

The system of example 13, wherein the at least one hardware processor comprises a general-purpose computer processor, the system further comprising memory storing instructions for execution by the general-purpose computer processor, at least some of the operations being performed by execution of the instructions.

Example 17

The system of any one of examples 13-16, further comprising a stereo camera device.

Example 18

The system of example 17, wherein the stereo camera device and the at least one processor are integrated into a stand-alone device.

Example 19

The system of any of examples 13-18, wherein each of the pixelwise feature vectors comprises a minimum-cost disparity value from each of the plurality of proposal cost volumes, and wherein computing the disparity estimates further comprises: selecting, for each of the pixels, among the minimum-cost disparity values from the plurality of proposal cost volumes, a minimum-cost disparity value from a proposal cost volume having a highest associated posterior probability for that pixel.

Example 20

One or more machine-readable media storing instructions for execution by one or more hardware processors, execution of the instructions causing the one or more hardware processors to perform operations comprising: computing, from a pair of two-dimensional digital stereo images comprising a base image and a match image, a plurality of proposal cost volumes each representing a pixelwise cost as a function of disparity; computing pixelwise feature vectors comprising disparity and cost values sparsely sampled from the proposal cost volumes, and using a predictive model to compute, from the pixelwise feature vectors, disparity estimates for pixels within a base image of the pair of stereo images.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A stereo-matching method comprising:
computing, with one or more hardware processors, from a pair of two-dimensional digital stereo images, a plurality of proposal cost volumes each representing a pixelwise cost as a function of disparity;
computing, with the one or more hardware processors, pixelwise feature vectors comprising disparity and cost values sparsely sampled from the proposal cost volumes; and
using a predictive model to compute, with the one or more hardware processors, from the pixelwise feature vectors, disparity estimates for pixels within a base image of the pair of stereo images.

2. The method of claim 1, wherein computing the pixelwise feature vectors comprises, for each of the feature vectors, selecting, from each of the plurality of proposal cost volumes, a respective minimum-cost disparity value.

3. The method of claim 2, wherein computing the pixelwise feature vectors further comprises, for each of the feature vectors, sampling the cost values of all of the proposal cost volumes at each of the minimum-cost disparity values.

4. The method of claim 2, wherein computing the disparity estimates comprises:
selecting, for each of the pixels, one of the minimum-cost disparity values from the plurality of proposal cost volumes based on posterior probabilities associated, for that pixel, with the plurality of proposal cost volumes.

5. The method of claim 4, wherein, for each of the pixels, the selected one of the minimum-cost disparity values constitutes an initial disparity estimate, and wherein computing the disparity estimates further comprises:
computing, for each of the pixels, a refined disparity estimate as a weighted average of minimum-cost disparity values in a vicinity of the initial disparity estimate, weights in the weighted average being posterior probabilities associated with the proposal cost volumes corresponding to the minimum-cost disparity values.

6. The method of claim 1, further comprising:
computing, using the predictive model, confidence measures associated with the disparity estimates for the pixels.

7. The method of claim 6, further comprising:
computing, for each of the pixels, a spatially filtered disparity estimate as a median of disparity estimates of pixels within a local neighborhood comprising pixels with similar image intensity and with associated confidence measures above a specified threshold.

8. The method of claim 1, wherein the predictive model is a classifier model.

9. The method of claim 8, wherein the classifier model is a random-forest model.

10. The method of claim 1, wherein the proposal cost volumes comprise proposal cost volumes obtained by one-dimensional scanline optimizations for a plurality of scanline directions.

11. The method of claim 1, wherein all of the scanline direction associated with the one-dimensional scanline optimizations fall within a single semicircle of directions.

12. The method of claim 1, further comprising computing depths associated with the disparity estimates for use in a downstream method.

13. A computer-vision system comprising:
at least one hardware processor configured to perform operations comprising:
computing, from a pair of two-dimensional digital stereo images comprising a base image and a match image, a plurality of proposal cost volumes each representing a pixelwise cost as a function of disparity;

computing pixelwise feature vectors comprising disparity and cost values sparsely sampled from the proposal cost volumes; and using a predictive model to compute, from the pixelwise feature vectors, disparity estimates for pixels within a base image of the pair of stereo images.

14. The system of claim 13, wherein the at least one hardware processor comprises at least one of a field-programmable gate array or an application-specific integrated circuit.

15. The system of claim 14, wherein all of the scanline direction associated with the one-dimensional scanline optimizations fall within a single semicircle of directions.

16. The system of claim 13, wherein the at least one hardware processor comprises a general-purpose computer processor, the system further comprising memory storing instructions for execution by the general-purpose computer processor, at least some of the operations being performed by execution of the instructions.

17. The system of claim 13, further comprising a stereo camera device.

18. The system of claim 17, wherein the stereo camera device and the at least one processor are integrated into a stand-alone device.

19. The system of claim 13, wherein each of the pixelwise feature vectors comprises a minimum-cost disparity value from each of the plurality of proposal cost volumes, and wherein computing the disparity estimates further comprises:

selecting, for each of the pixels, among the minimum-cost disparity values from the plurality of proposal cost volumes, a minimum-cost disparity value from a proposal cost volume having a highest associated posterior probability for that pixel.

20. One or more machine-readable media storing instructions for execution by one or more hardware processors, execution of the instructions causing the one or more hardware processors to perform operations comprising:

computing, from a pair of two-dimensional digital stereo images comprising a base image and a match image, a plurality of proposal cost volumes each representing a pixelwise cost as a function of disparity;

computing pixelwise feature vectors comprising disparity and cost values sparsely sampled from the proposal cost volumes; and using a predictive model to compute, from the pixelwise feature vectors, disparity estimates for pixels within a base image of the pair of stereo images.

* * * * *